(12) United States Patent
Lee et al.

(10) Patent No.: US 11,533,306 B2
(45) Date of Patent: Dec. 20, 2022

(54) PROCESSES AND METHOD FOR SAFE OF USE, MONITORING AND MANAGEMENT OF DEVICE ACCOUNTS IN TERMINAL MANNER

(71) Applicant: Global Wisdom Software Technology CO. LTD., Taichung (TW)

(72) Inventors: Chih Hung Lee, New Taipei (TW); Jye Luo, Taichung (TW); Chih Shun Chen, New Taipei (TW); Chih Chung Chen, New Taipei (TW)

(73) Assignee: GLOBAL WISDOM SOFTWARE TECHNOLOGY CO. LTD., Taichung (TW)

( * ) Notice: Subject to any disclaimer, the term of this patent is extended or adjusted under 35 U.S.C. 154(b) by 147 days.

(21) Appl. No.: 17/123,382

(22) Filed: Dec. 16, 2020

(65) Prior Publication Data
US 2022/0191201 A1    Jun. 16, 2022

(51) Int. Cl.
*H04L 29/06* (2006.01)
*H04L 9/40* (2022.01)

(52) U.S. Cl.
CPC ........ *H04L 63/0876* (2013.01); *H04L 63/102* (2013.01); *H04L 63/20* (2013.01)

(58) Field of Classification Search
CPC ... H04L 63/0876; H04L 63/102; H04L 63/20; H04L 63/108
See application file for complete search history.

(56) References Cited

U.S. PATENT DOCUMENTS

| | | | | |
|---|---|---|---|---|
| 11,012,233 B1* | 5/2021 | Uhr | ....................... | H04L 9/0847 |
| 11,063,770 B1* | 7/2021 | Peng | ....................... | G06F 21/64 |
| 11,093,933 B1* | 8/2021 | Peng | ....................... | H04L 63/101 |

FOREIGN PATENT DOCUMENTS

| | | |
|---|---|---|
| CN | 111064749 A | 4/2020 |
| CN | 109005186 B | 12/2020 |

* cited by examiner

*Primary Examiner* — Baotran N To
(74) *Attorney, Agent, or Firm* — Sinorica LLC

(57) ABSTRACT

A method and structure uses a decentralized network to connect and manage multiple devices. The method includes the steps of: applying for a decentralized identity in the decentralized network, and binding the decentralized identity with a digital identity; storing a correspondingly generated binding information in the decentralized network; authorizing one of the devices, to which the digital identity is allowed to connect, and an allowable account; storing a correspondingly generated authorization information in the decentralized network; when necessary, updating and storing an authentication information of the bound digital identity in the decentralized network; retrieving the authentication information from the decentralized network through a terminal device to process certification for connecting the one of the devices.

21 Claims, 9 Drawing Sheets

PROCESSES AND METHOD FOR SAFE OF USE, MONITORING AND MANAGEMENT OF DEVICE ACCOUNTS IN TERMINAL MANNER

BACKGROUND OF THE INVENTION

1. Technical Field

The present invention relates generally to the connection and management of a connected device in a network, and more particularly to a method and structure using a decentralized network to save and read authentication, and to manage and use information; the method and structure could ensure the safety of the authentication information required in authentication actions of users or devices, and could also ensure the safety while using devices, whereby to ensure the safe use of devices.

2. Description of Related Art

In the information age, news of hacker attacks is heard from time to time. Although the methods may change rapidly, attacks are still mainly done by stealing accounts and passwords. Since most of the major internal equipment of enterprises or government institutions is accessed through remote connection from terminal devices, this kind of operational structure is easy for hackers to take advantage of. For example, in May 2020, several enterprises, including CPC Corporation in Taiwan, were attacked by ransomware. According to the investigation of Taiwan's Ministry of Justice Investigation Bureau, hackers stole account privileges through personal computers and database servers of the employees of these enterprises and then manipulated the grouping principle of domain control servers to install ransomware in the employees' computers. In these cases, stealing accounts and passwords is the first step in the hacker's attack. Therefore, if the enterprise's intranet can provide better protection for authentication information (e.g., passwords for authentication), subsequent hacker attacks can actually be prevented.

It is worth noting that computers are not the only target of hackers. With the vigorous development of the Internet of things (IoT) in recent years, there are already a huge number of smart home appliances connected to the Internet, providing all kinds of unexpected ways of intrusion. Routers, vehicle computers, and even smart coffee machines may become hackers' stepping stones. The well-known malware Mirai, for example, is designed to attack IoT devices that use Linux firmware, using these IoT devices as a stepping stone for further attacks on other devices in the network.

The industry often relies on its own proprietary systems or employee to manage device passwords on the Internet of Things, but there are still a large number of IoT devices whose passwords are completely unprotected or severely under-protected. In fact, even if a proprietary system is used, it obviously cannot provide satisfactory protection. Whether in the Internet of Things or enterprise intranet, the storage, reading, and authentication of device passwords or login authentications are mostly performed by centralized or gathered frameworks or systems, and the operation traces of various devices in the Internet of Things or enterprise intranet are usually stored and read through such centralized or gathered frameworks or systems. As for the authentication operations on the centralized or gathered architecture or system, they are still mainly done through accounts and passwords. The numerous hacker attacks have proven that this way of operation and structure is not secure, and there is much room for improvement.

BRIEF SUMMARY OF THE INVENTION

In view of the above, the objective of the present invention is to provide a method and structure of using a decentralized network to connect and manage multiple devices, which provides high security, availability and usability.

The present invention provides a method of using a decentralized network to connect and manage a device in a device network, wherein the device network has multiple devices including said device. The method includes the following steps: apply for a decentralized identity in the decentralized network; bind the decentralized identity with a digital identity which is allowed to connect to the device, and save a correspondingly generated binding information in the decentralized network, wherein the digital identity has an authentication information; authorize an account applicable for the device which the digital identity is allowed to connect to, and save a correspondingly generated authorization information in the decentralized network; update the authentication information corresponding to the digital identity concerning the device and the account through a randomizing rule when a condition is met, and save the updated authentication information in the decentralized network; retrieve the updated authentication information from the decentralized network through a terminal device, and use the authentication information to authenticate while connecting to the device, wherein the terminal device has an identity information bound with the decentralized identity, and the identity information is generated after the terminal device accomplishing an identity authentication action.

In an embodiment, after the terminal device accomplished the identity authentication action to generate the identity information, the method further includes the step of retrieving the authorization information of the device from the decentralized network, and then, based on the authorization information, using the authentication information to authenticate while connecting to the device.

In an embodiment, after the identity information is generated, the method further includes the step of capturing a history log while using the authentication information to connect to the device, and saving the history log in the decentralized network.

In an embodiment, the history log includes an input data.

In an embodiment, the history log includes an output data.

In an embodiment, after the history log is saved in the decentralized network, the method further includes the step of retrieving the history log from the decentralized network to review a connecting process of the device with another terminal device, of which a digital identity has been generated after accomplishing the identity authentication action.

In an embodiment, the condition is satisfied when a time period has passed.

In an embodiment, the condition is satisfied when the device has been connected to with the account.

In an embodiment, the digital identity is managed by an identity management system.

The present invention further provides a network connection and management structure, which includes a device network, a terminal device, and a decentralized network. The device network includes a plurality of devices. The terminal device has an identity information, and is installed with a management program, wherein the identity information is generated by the terminal device through accomplishing an identity authentication action. The decentralized network provides a decentralized identity, wherein the decentralized identity is bound with a digital identity which is allowed to be connected to one of the devices. The digital identity has an authentication information. In addition, the decentralized identity is also bound with the identity information of the terminal device. When a condition is satisfied, the management program of the terminal device updates the authentication information of the digital identity allowed to be connected to the one of the devices through a randomizing rule, and saves the updated authentication information in the decentralized network. When the terminal device is going to connect to the one of the devices of the device network, the management program retrieves the updated authentication information from the decentralized network, and uses the authentication information for authentication required to connect to said device.

In an embodiment, the management program of the terminal device captures a history log of the terminal device while connecting to the one of the devices of the device network, and saves the history log in the decentralized network.

In an embodiment, the history log includes an input data.

In an embodiment, the history log comprises an output data.

In an embodiment, the management program of the terminal device retrieves the history log from the decentralized network to review a process of connecting the terminal device and the one of the devices of the device network.

In an embodiment, the device network includes an internet of things.

In an embodiment, the device network includes an enterprise intranet.

In an embodiment, the structure further includes an identity management system, which owns and manages the digital identity.

In an embodiment, the authentication information of the digital identity owned by the identity management system includes a login authentication.

In an embodiment, the authentication information of the digital identity owned by the identity management system includes a password.

In an embodiment, the condition is satisfied when a time period has passed.

In an embodiment, the condition is satisfied when the one of the devices has been connected to with an account.

By using a decentralized network to store and retrieve authentication information, the vulnerability of a centralized or gathered architecture or system to hackers can be avoided. Furthermore, the randomly processed authentication information, as well as the identity information bound to the decentralized identity on the terminal device, dramatically increases the difficulty of intrusion. Therefore, the present invention provides higher security than conventional practices, while increasing usability and convenience.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
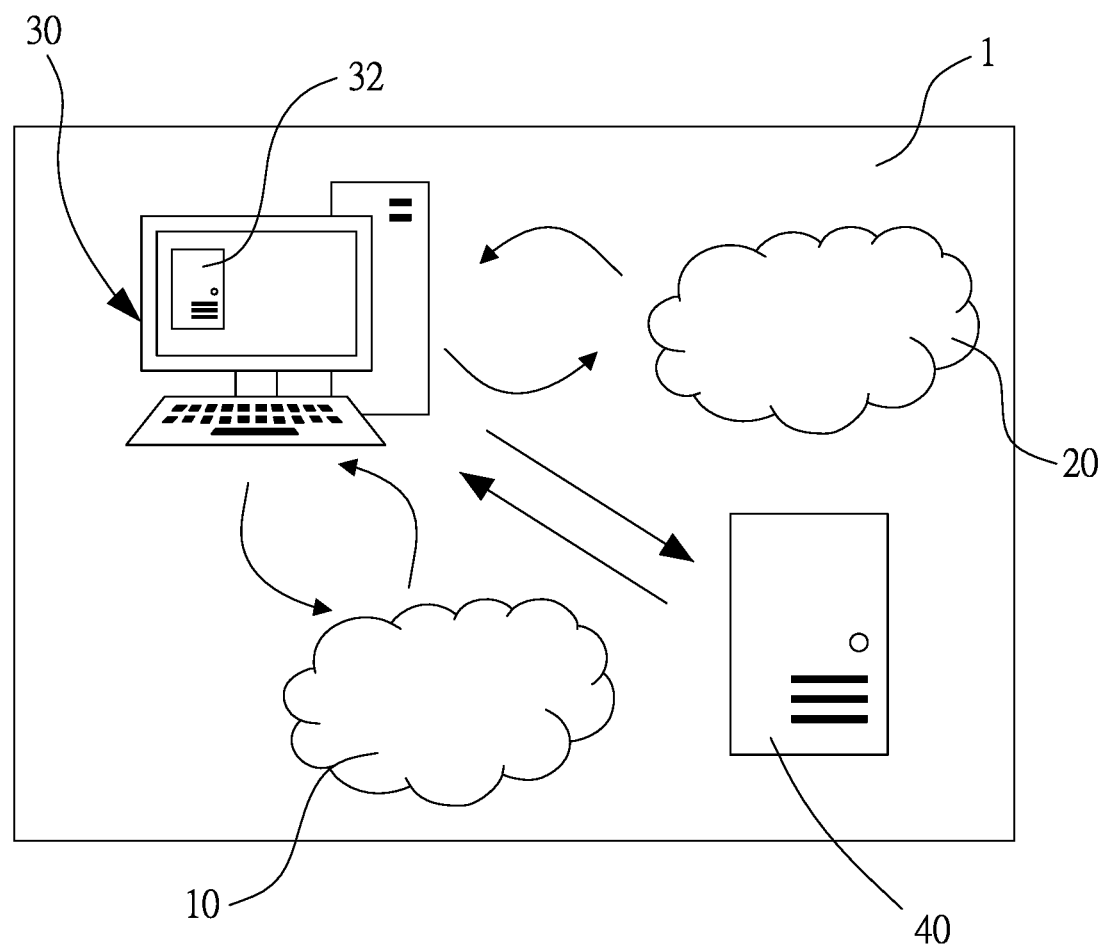
FIG. 1 is a schematic view showing the network connection and management structure of a first embodiment of the present invention.

A network usage architecture 1 of an embodiment of the present invention is shown in FIG. 1, including a decentralized network 10, a device network 20, a terminal device 30, and an identity management system 40.

The device network 20 includes a plurality of devices (not shown). The identity management system 40 is in charge of managing at least one digital identity which is allowed to use one of the devices in the device network 20. Specifically, each digital identity corresponds to a user in the real world, and the user has to pass an authentication to confirm the correctness of their identity before getting the digital identity belonged to them. After that, the user would be able to use the device in the device network 20 through the digital identity. To ensure the reliability of the authentication, each digital identity respectively has an authentication information, and the user has to provide correct information which matches the authentication information to pass and accomplish the authentication. The authentication information mentioned herein could be login authentication or password. However, these demonstrated practices are not limitations of the present invention; the type and content of the authentication information could be varied in different embodiments depending on the design of the devices in the device network 20.

More specifically, any network that has multiple devices connected therein, and requires user to login for identity check before allowing them to use any one device among the devices, can be deemed the device network 20 mentioned in the present invention. Therefore, the device network 20 could be an internet of things (IoT), or an enterprise intranet. In an embodiment that the device network 20 is an internet of things, the devices contained therein could be vendor machines with online functions, automatic thermostats, electric lights, all kinds of smart home appliances, etc. The actual types of the devices are not designated, and are not limitations of the present invention. In another embodiment that the device network 20 is an enterprise intranet, the devices contained therein could be employees' personal computers, public mail servers, etc., while the aforementioned identity management system 40 could be Microsoft® AD, lightweight directory access protocol (LDAP), or other software with authorization of identity or one of the devices. Similarly, the actual types of the devices in the enterprise intranet are not limitations of the present invention, and we are not going to explicitly name them herein.

The terminal device 30 is installed with a management program 32, and the user who takes the terminal device 30 could, through the management program 32, directly connect to one of the devices in the device network 20, or could perform said connection by installing a device connecting program through the terminal device 30. Furthermore, the user would be able to manage the device they connect to. In practice, the terminal device 30 could be all kinds of devices running Windows®, Linus®, Android®, iOS® or MacOS®, and are not limited to be a portable device or personal computers; the terminal device 30 could even be an operating system or device that are not yet invented for now. In addition, any network which in principal has a decentralized architecture can be deemed the decentralized network 10 mentioned in the present invention, and should at least provide the following decentralized functions: providing decentralized identities upon requested, performing decentralized computation (e.g., open-source distributed ledger IOTA), and decentralized saving (e.g., interplanetary file system, or IPFS). In practice, the decentralized network 10 could be a part of, or a combination of, decentralized networks such as block chain, directed acyclic graph (DAG), raiden network, lightning network, aforementioned open-source distributed ledger and interplanetary file system, etc. The decentralized network 10 could also be a decentralized network architecture which is not yet invented for now. It has to be clarified that, in practical scenario, the aforementioned identity management system 40 could also be integrated with the management program 32; or, the job of the identity management system 40 regarding managing these digital identities could be deemed one of the functions of the management program 32.

In the network usage architecture 1 disclosed in the present invention, the management program 32 of the terminal device 30 applies for a decentralized identity (DID) to the decentralized network 10, and the decentralized identity will be bound with one of the digital identities managed by the management program 32, so that the decentralized identity can be deemed equivalent to the bound digital identity in the management program 32. Through the binding mentioned herein, a binding information would be generated, and the binding information can be saved in the decentralized network 10 to be used in a later time. The management program 32 could use the functions of Windows AD or similar programs to accomplish the aforementioned binding, or, it could be done through e-mails or other means which can confirm the identity of the user. The device that the digital identity is allowed to connect to and an account which can be used for the connection will be authorized, whereby to generate an authorization information, which is also saved in the decentralized network 10.

In addition, the decentralized identity will be also bound with an identity information of the terminal device 30. The identity information mentioned herein is generated by the terminal device 30 through an identity authentication action, and corresponds to the true identity of the user with the terminal device 30. In other words, the user who takes the terminal device 30 could have their identity confirmed on the terminal device 30 by accomplishing the identity authentication action and generating the identity information. In practice, the identity authentication action could be done by entering account and password by the user, and could be alternatively done with other types of authentication information or means of biometrics. If the strength of identity authentication is considered insufficient, the management program 32 could further enhance the security by using one-time password (OTP).

Once the identity information of the terminal device 30 and the decentralized identity are successfully bound, hereinafter, the management program 32 owned by the terminal device 30 could easily verify the identity after the terminal device 30 accomplishes the identity authentication action. Or, in an alternative way, the management program 32 could perform identity authentication to the decentralized network 10, whereby to confirm the correctness of the user identity of the terminal device 30.

As mentioned above, the management program 32 of the terminal device 30 is in charge of managing the at least one digital identity that is allowed to connect to one of the devices of the device network 20, wherein each digital identity respectively has the authentication information required for authentication. To further improve the security of authentication, the management program 32 of the terminal device 30 would update the authentication information owned by one of more than one digital identity on the devices of the device network 20 through a randomizing rule if a certain condition is satisfied. The updated authentication information would be saved in the decentralized network 10 by the management program 32. In practice, the certain condition mentioned herein could be deemed satisfied when a specific time period has passed, or every time when the device is connected with the account. When it is required to take the authentication action in a later time, the management program 32 of the terminal device 30 would retrieve the updated authentication information from the decentralized network 10 to connect the device, which is designated, in the device network 20. Said method could be used instead of entering authentication information by the user. In this way, the authentication could be accomplished, and the user could login the device in the device network 20.

For future reference and to keep a record, during the process of connecting the device of the device network 20 as mentioned above, the management program 32 of the terminal device 30 could capture a history log, and could save the history log in the decentralized network 10. The history log includes an input data of the terminal device 30, including but not limited to keyboard input, content in the clipboard, voice input, etc. In addition, the history log could further include an output data of the terminal device 30, including but not limited to screenshot, content in the clipboard, voice output, etc. Of course, in practice, the history log could only include one of the input data and the output data. When it is required to access the history log, the management program 32 of the terminal device 30 (or another digital identity which has passed identity authentication by the management program 32 of another terminal device 30) could retrieve the history log out from the decentralized network 10 for review or download, so that users would be able to know how the device is connected.

Figure 2:
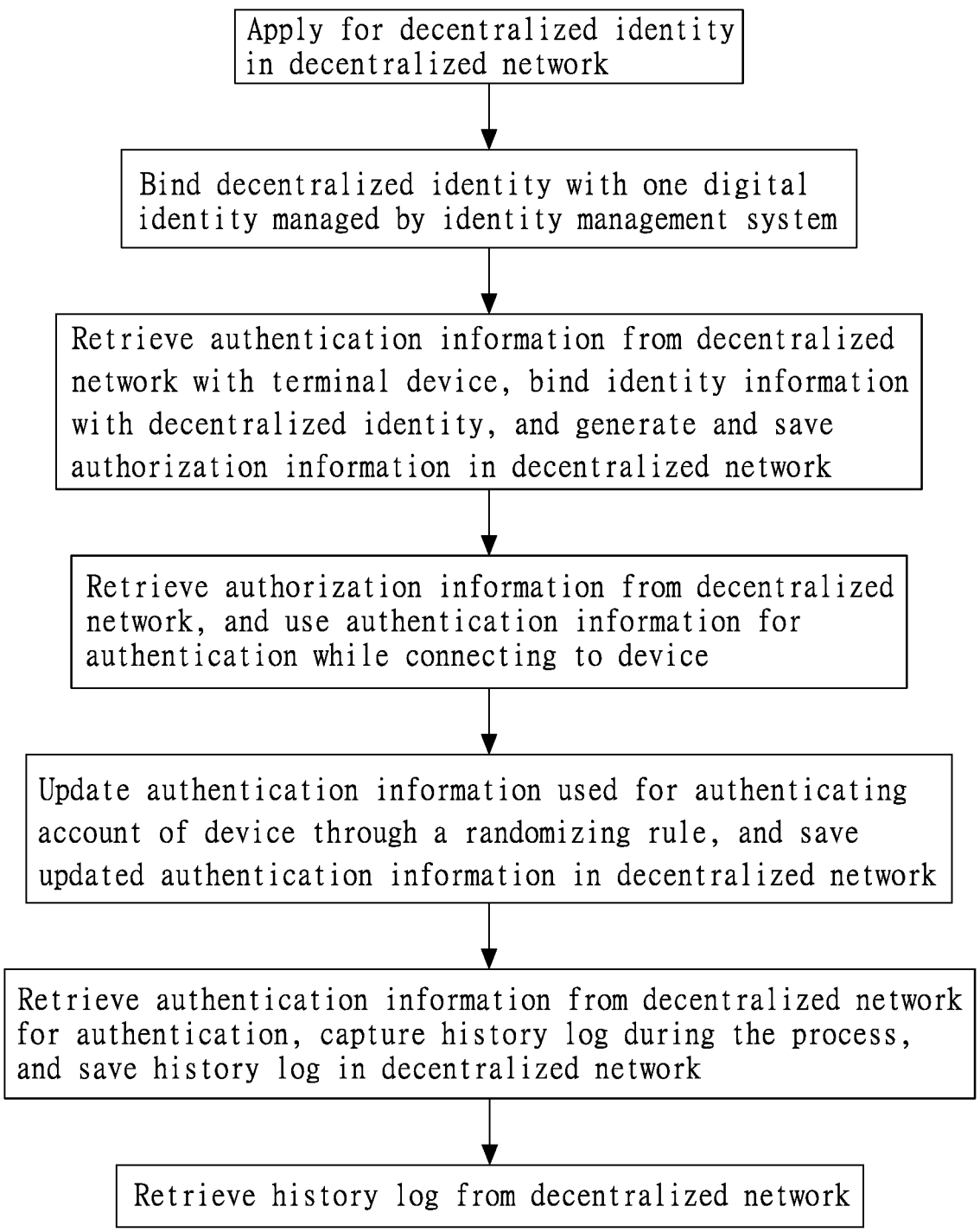
FIG. 2 is a flowchart of the method of using a decentralized network to connect and manage one device in a device network.
Figure 3:
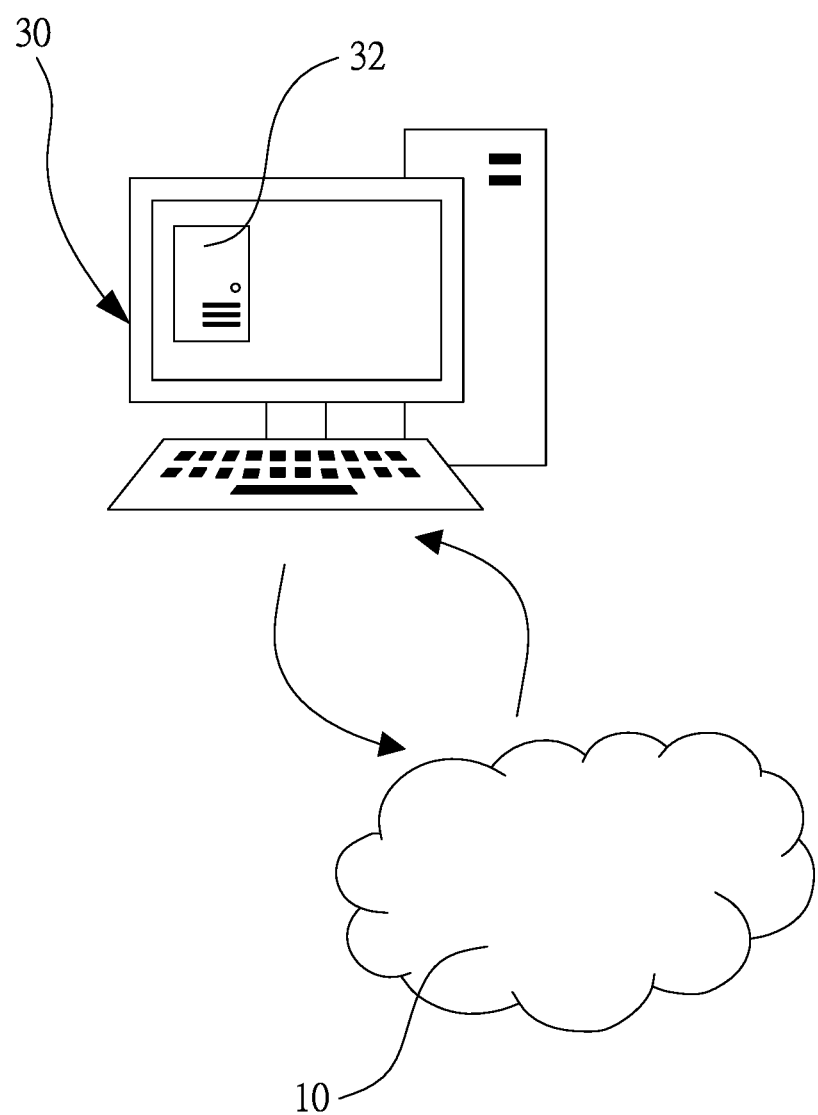
FIG. 3 is a schematic view showing the interaction between the terminal device and the decentralized network in the first step of FIG. 2.

Herein we take a method with multiples steps to illustrate the content of the present invention, and the method is shown in FIG. 2. The method of connecting and managing one of the devices in the device network 20 by using the decentralized network 10 includes the following steps:

i. Apply for the decentralized identity to the decentralized network 10. As shown in FIG. 3, in the current step, the management program 32 of the terminal device 30 requests the decentralized network 10, and then the decentralized network 10 responses the request by providing the decentralized identity.

Figure 4:
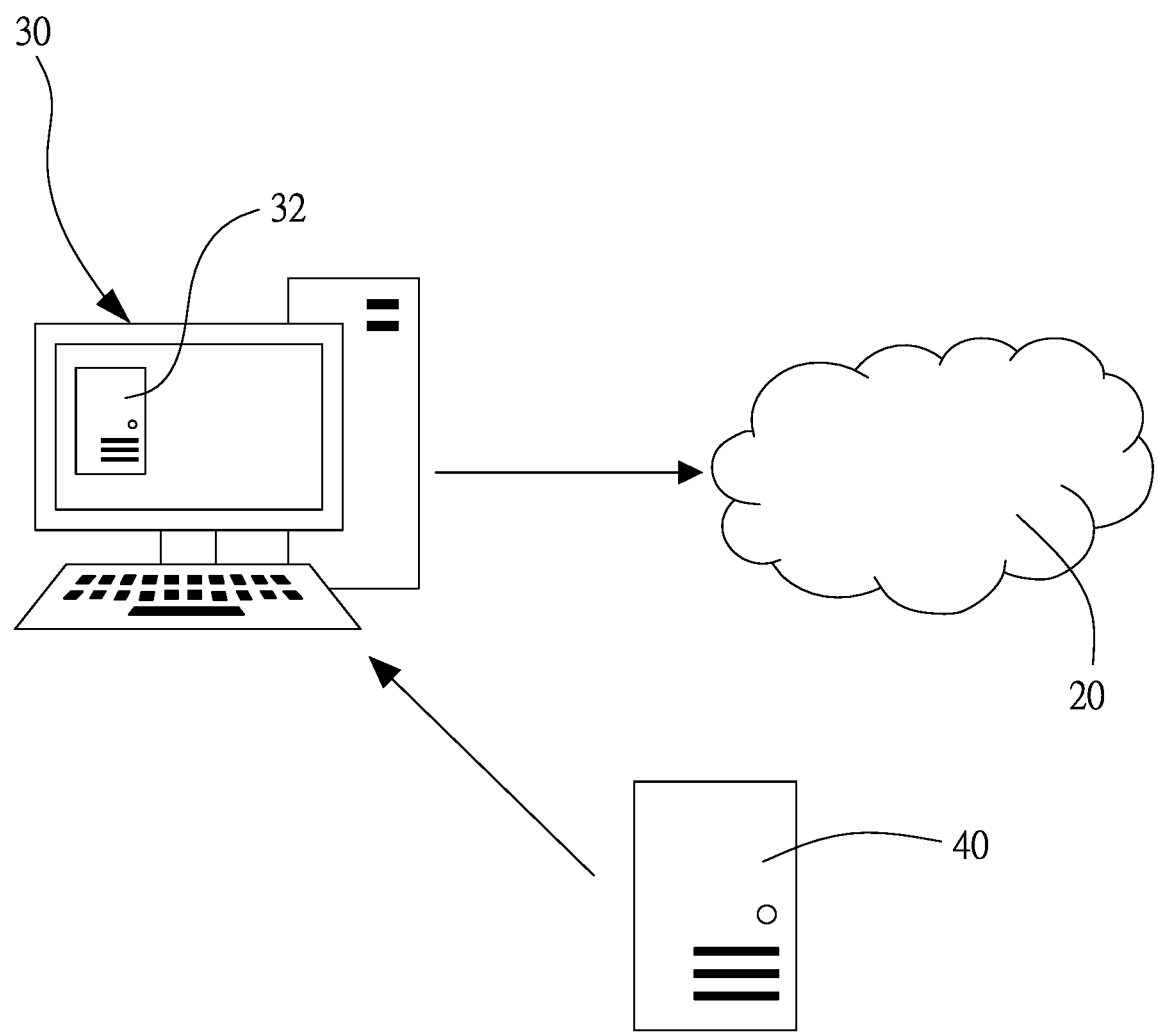
FIG. 4 is a schematic view showing the interaction between the terminal device, the identity management system, and the device network in the second step of FIG. 2.

Ii. Bind the decentralized identity with one of the at least one digital identity managed by the identity management system 40. As shown in FIG. 4, in the current step, the management program 32 of the terminal device 30 binds the decentralized identity with one of the at least one digital identity. The correspondingly generated binding information can be saved in the decentralized network 10.

Figure 5:
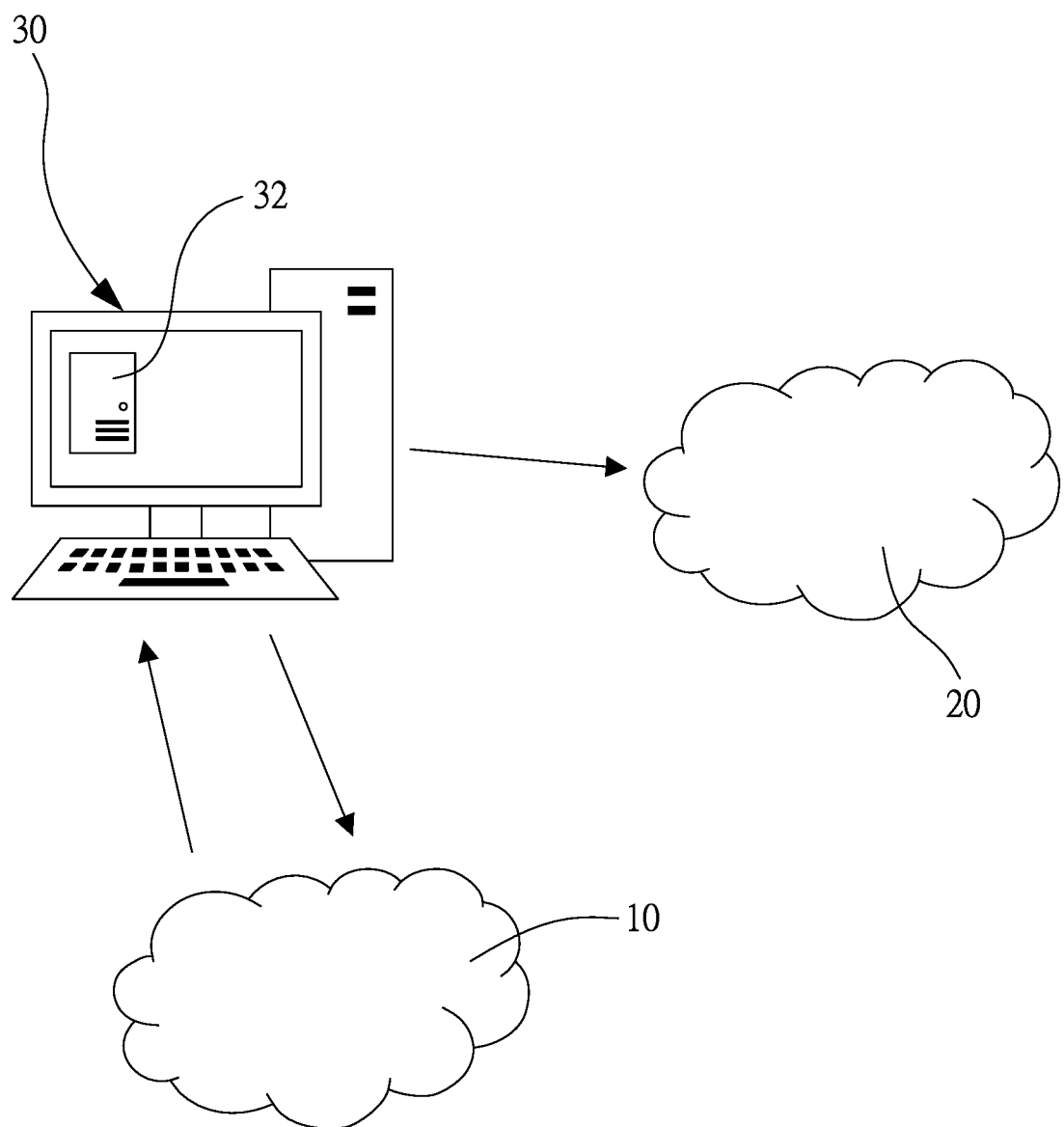
FIG. 5 is a schematic view showing the interaction between the terminal device, the decentralized network, and the device network in the third step of FIG. 2.
Figure 6:
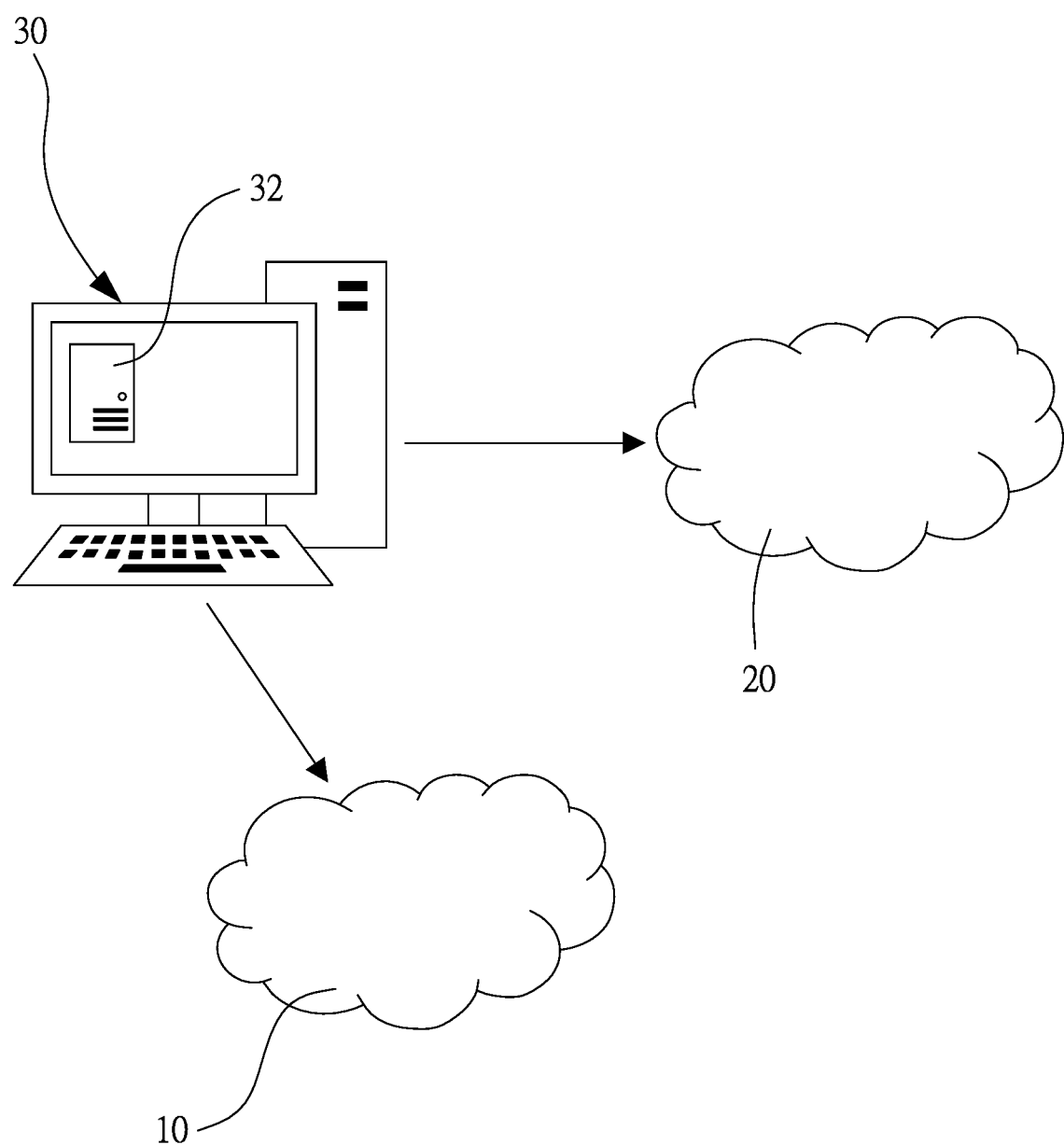
FIG. 6 is a schematic view showing the interaction between the terminal device, the decentralized network, and the device network in the fourth step of FIG. 2.
Figure 7:
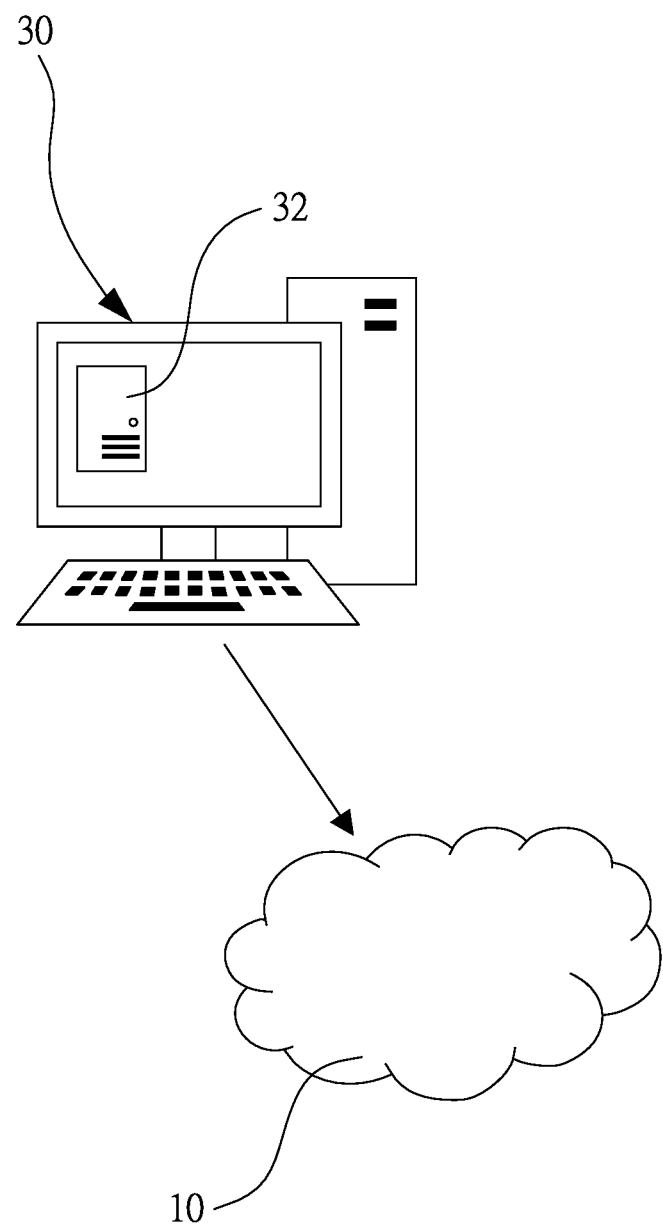
FIG. 7 is a schematic view showing the interaction between the terminal device and the decentralized network in the fifth step of FIG. 2.
Figure 8:
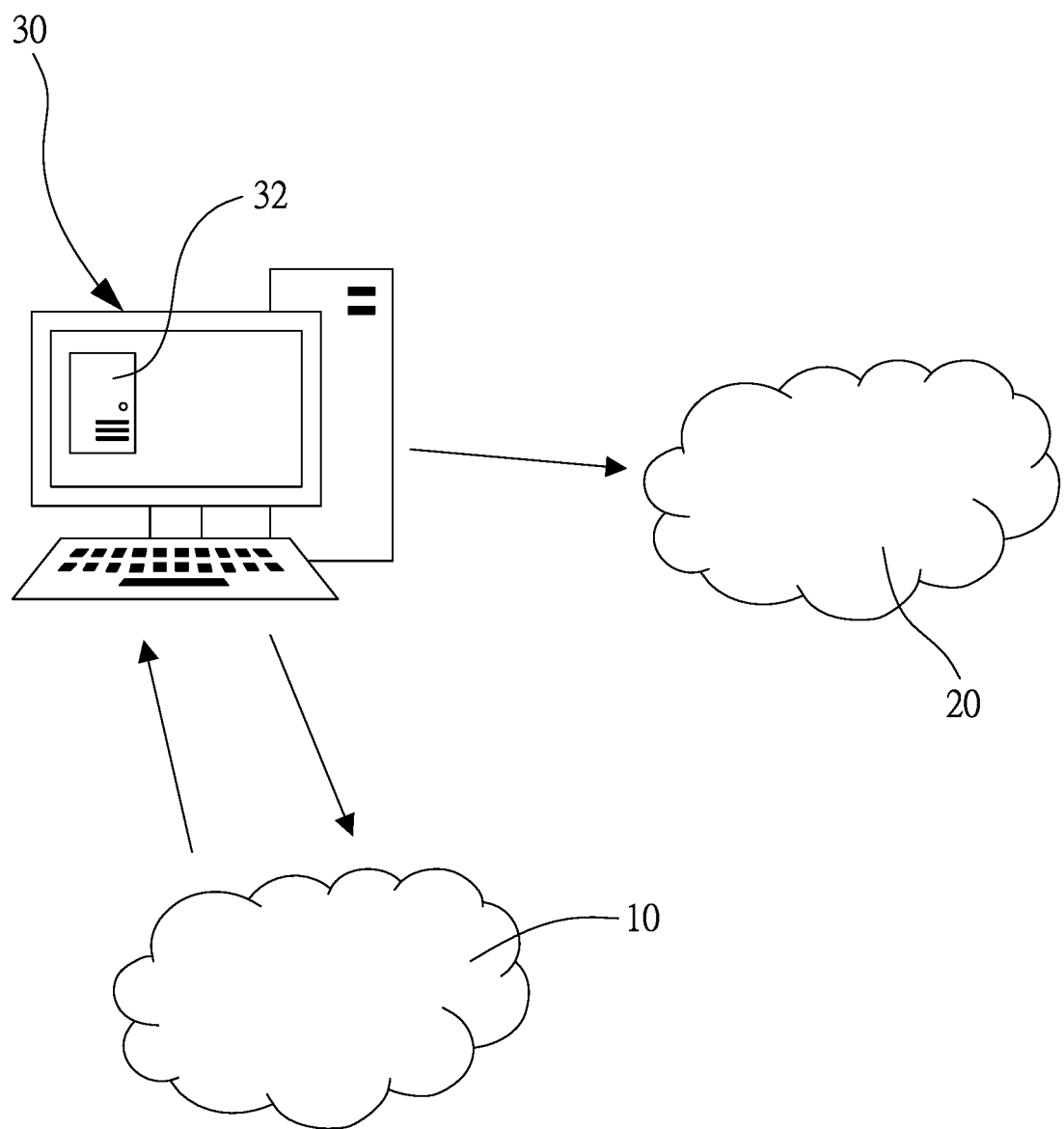
FIG. 8 is a schematic view showing the interaction between the terminal device, the decentralized network, and the device network in the sixth step of FIG. 2.
Figure 9:
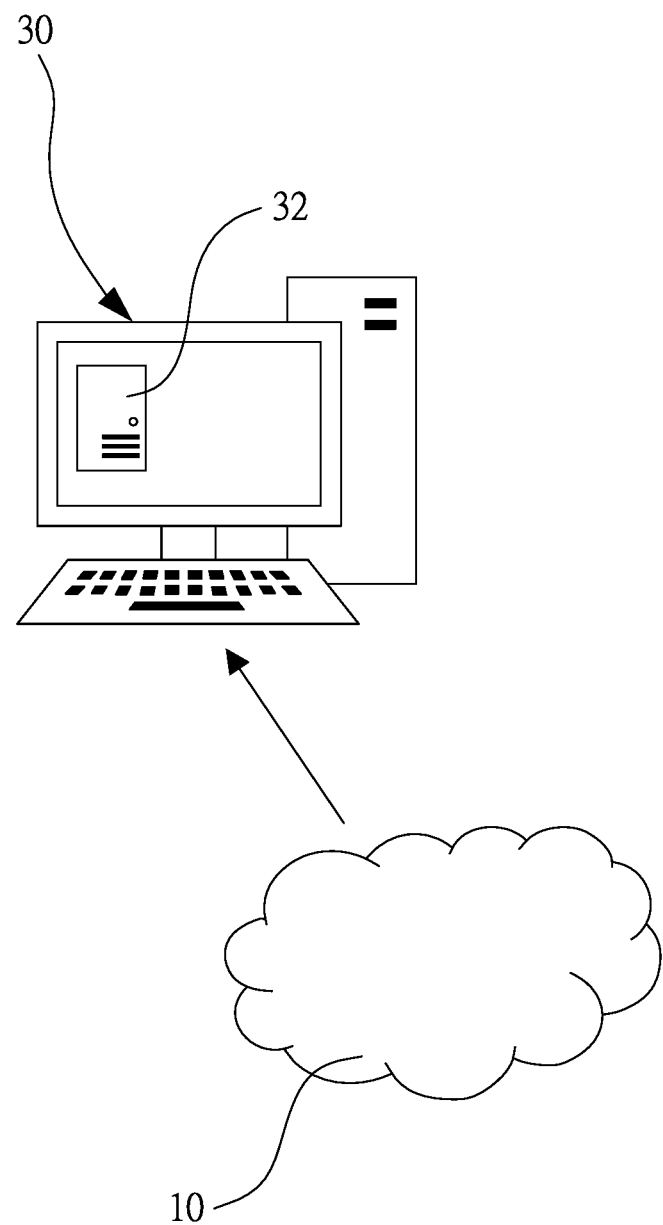
FIG. 9 is a schematic view showing the interaction between the terminal device and the decentralized network in the seventh step of FIG. 2.

Iii. Retrieve the authentication information through the management program 32 of the terminal device 30, and bind the identity information owned by the terminal device 30 with the decentralized identity. At this time, the device that the digital identity is allowed to connect to and an account which can be used to connect the device are authorized. A correspondingly generated authorization information is saved in the decentralized network 10. As shown in FIG. 5, in the current step, the management program 32 of the terminal device 30 retrieves the authentication information from the decentralized network 10, and the authorization of the device and the account are done in the device network 20. After that, the authorization information is transferred to the decentralized network 10 to be saved therein.

iv. Retrieve the authorization information from the decentralized network 10, and use the authentication information for authentication while connecting to the device. As shown in FIG. 6, the management program 32 of the terminal device 30 retrieves the authorization information from the decentralized network 10, and uses the authentication information for the authentication action while connecting to the device in the device network 20.

v. After the passing of the time period, or every time when the device is connected with the account, the management program 32 of the terminal device 30 generates a new authentication information (e.g., password) through a randomizing rule, and replaces the original authentication information, which is used while authenticating the account for connecting to the device, with the new generated authentication information. This updated authentication information is then saved in the decentralized network 10. As shown in FIG. 7, the management program 32 of the terminal device 30 uses the randomizing rule to change the authentication information, and, after that, saves the updated authentication information in the decentralized network 10.

vi. The management program 32 of the terminal device 30 retrieves the authentication information, which is required while authenticating for connecting the device in the device network 20, from the decentralized network 10, and then uses the authentication information for authentication while connecting to the device. In current step, the management program 32 captures the history log regarding the process of connecting the terminal device 30 to the device in the device network 20, and then saves the history log in the decentralized network 10. As shown in FIG. 8, in the current step, after the management program 32 of the terminal device 30 captures the history log, the management program 32 saves it in the decentralized network 10. After that, the method provided in the present invention takes the next, and the last step.

vii. Retrieve the history log of the terminal device 30 from the decentralized network 10 for review or download. In practice, the current step could be also performed by another digital identity that has passed the identity authentication. As shown in FIG. 9, in the current step, the management program 32 of the terminal device 30 retrieves the history log which is previously saved in the decentralized network 10, and then users could review the history log, or even save the history log to another location.

It has to be clarified that, before taking the aforementioned third step, the terminal device 30 should have already accomplished the identity authentication action to generate the identity information, so that the identity information can be bound with the decentralized identity in the third step mentioned above. However, the identity authentication action mentioned herein is not necessary to happen immediately after the aforementioned second step; the terminal device 30 could have the identity authentication action accomplished several steps ahead (even before the aforementioned first step). On the other hand, the terminal device 30 could also request the user to do the identity authentication action right before performing the aforementioned third step. Whatever the case may be, it does not affect the binding of the identity information and the decentralized identity.

It is understood that all the actions performed by the management program 32 of the terminal device 30 in the present invention can of course be shared by more than one system or software, and it is not necessary for a single program to be responsible for all the work. In addition, the management program 32, in addition to operating on a single device (i.e., the terminal device 30) as in the present invention, may in other embodiments be distributed among multiple devices or equipment to achieve the aforementioned functions through synergistic operation among them. In addition, although the management program 32 is owned by the terminal device 30 in the present invention, logically the management program 32 can also be installed outside the terminal device 30, either as an independent system, or as other means of implementation with hardware or firmware.

Furthermore, the history log kept by the management program 32 of the present invention is certainly not limited to the input or output data previously exemplified; operation traces left by input and output devices that currently exist (but are not explicitly mentioned in the present invention) or that do not yet exist shall be considered to be within the scope of the input data or the output data.

From the above description of the invention, it is clear that, by using the decentralized network 10 to save and access the authentication information, the present invention could avoid the drawbacks of a centralized or gathered architecture that is vulnerable to hackers. In addition, the authentication information required while connecting to the device of the device network 20 is processed by randomization, and the identity information of the terminal device 30 is bound with the decentralized identity as well, which would both further increase the difficulty of invasion. Therefore, the present invention would provide a significant improvement in safety, usability, and convenience.

It must be pointed out that the embodiments described above are only some preferred embodiments of the present invention. All equivalent structures and methods which employ the concepts disclosed in this specification and the appended claims should fall within the scope of the present invention.

What is claimed is:

1. A method of using a decentralized network to connect and manage a device in a device network, wherein the device network has multiple devices including said device; the method comprising the steps of:

applying for a decentralized identity in the decentralized network;

binding the decentralized identity with a digital identity which is allowed to connect to the device, and saving a correspondingly generated binding information in the decentralized network, wherein the digital identity has an authentication information;

authorizing an account applicable for the device which the digital identity is allowed to connect to, and saving a correspondingly generated authorization information in the decentralized network;

updating the authentication information corresponding to the digital identity concerning the device and the account through a randomizing rule when a condition is met, and saving the updated authentication information in the decentralized network; and retrieving the updated authentication information from the decentralized network through a terminal device, and using the authentication information to authenticate while connecting to the device, wherein the terminal device has an identity information bound with the decentralized identity, and the identity information is generated after the terminal device accomplishing an identity authentication action.

2. The method of claim 1, further comprising the following step after the identity information is generated: after the terminal device accomplished the identity authentication action to generate the identity information, retrieve the authorization information of the device from the decentralized network, and then, based on the authorization information, use the authentication information to authenticate while connecting to the device.

3. The method of claim 1, further comprising the following step after the identity information is generated: capture a history log while using the authentication information to connect to the device, and save the history log in the decentralized network.

4. The method of claim 3, wherein the history log comprises an input data.

5. The method of claim 3, wherein the history log comprises an output data.

6. The method of claim 3, further comprising the following step after the history log is saved in the decentralized network: retrieve the history log from the decentralized network to review a connecting process of the device with another terminal device, of which a digital identity has been generated after accomplishing the identity authentication action.

7. The method of claim 1, wherein the condition is satisfied when a time period has passed.

8. The method of claim 1, wherein the condition is satisfied when the device has been connected to with the account.

9. The method of claim 1, wherein the digital identity is managed by an identity management system.

10. A network connection and management system, comprising:

a device network comprising a plurality of devices;

a terminal device, which has an identity information, and is installed with a management program, wherein the identity information is generated by the terminal device through accomplishing an identity authentication action; and a decentralized network, which provides a decentralized identity, wherein the decentralized identity is bound with a digital identity which is allowed to be connected to one of the devices; the digital identity has an authentication information; in addition, the decentralized identity is also bound with the identity information of the terminal device;

wherein, when a condition is satisfied, the management program of the terminal device updates the authentication information of the digital identity allowed to be connected to the one of the devices through a randomizing rule, and saves the updated authentication information in the decentralized network; when the terminal device is going to connect to the one of the devices of the device network, the management program retrieves the updated authentication information from the decentralized network, and uses the authentication information for authentication required to connect to said device.

11. The network connection and management system of claim 10, wherein the management program of the terminal device captures a history log of the terminal device while connecting to the one of the devices of the device network, and saves the history log in the decentralized network.

12. The network connection and management system of claim 11, wherein the history log comprises an input data.

13. The network connection and management system of claim 11, wherein the history log comprises an output data.

14. The network connection and management system of claim 11, wherein the management program of the terminal device retrieves the history log from the decentralized network to review a process of connecting the terminal device and the one of the devices of the device network.

15. The network connection and management system of claim 10, wherein the device network comprises an internet of things.

16. The network connection and management system of claim 10, wherein the device network comprises an enterprise intranet.

17. The network connection and management system of claim 10, further comprising an identity management system, which owns and manages the digital identity.

18. The network connection and management system of claim 17, wherein the authentication information of the digital identity owned by the identity management system comprises a login authentication.

19. The network connection and management system of claim 17, wherein the authentication information of the digital identity owned by the identity management system comprises a password.

20. The network connection and management system of claim 10, wherein the condition is satisfied when a time period has passed.

21. The network connection and management system of claim 10, wherein the condition is satisfied when the one of the devices has been connected to with an account.

* * * * *